(12) United States Patent
Okabe

(10) Patent No.: US 9,849,733 B2
(45) Date of Patent: Dec. 26, 2017

(54) HEAVY DUTY PNEUMATIC TIRE

(71) Applicant: SUMITOMO RUBBER INDUSTRIES LTD., Kobe-shi (JP)

(72) Inventor: Taro Okabe, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 273 days.

(21) Appl. No.: 14/628,536

(22) Filed: Feb. 23, 2015

(65) Prior Publication Data

US 2015/0239300 A1    Aug. 27, 2015

(30) Foreign Application Priority Data

Feb. 24, 2014  (JP) ................................ 2014-032427

(51) Int. Cl.
| | |
|---|---|
| *B60C 15/00* | (2006.01) |
| *B60C 15/024* | (2006.01) |
| *B60C 15/06* | (2006.01) |

(52) U.S. Cl.
CPC ........ B60C 15/0607 (2013.01); B60C 15/024 (2013.01); B60C 15/0628 (2013.01); *B60C 2015/065* (2013.01); *B60C 2015/0614* (2013.01)

(58) Field of Classification Search
CPC ....... B60C 15/00; B60C 15/024; B60C 15/06; B60C 15/0628
See application file for complete search history.

(56) References Cited

FOREIGN PATENT DOCUMENTS

| | | | |
|---|---|---|---|
| GB | 995645 | * | 6/1965 |
| JP | 10-044724 A | | 2/1998 |

* cited by examiner

*Primary Examiner* — Justin Fischer
(74) *Attorney, Agent, or Firm* — Oblon, McClelland, Maier & Neustadt, L.L.P.

(57) ABSTRACT

A heavy duty pneumatic tire includes a pair of beads, a carcass and a pair of bead fillers laminated outward with respect to the beads in the axial direction, respectively. Each bead includes a core and an apex, the carcass includes a carcass ply folded back around the core and having a main portion and a folding-back portion, each bead filler has an outer edge, an inner edge and a fitting portion to fit to a rim, the fitting portion includes a bottom surface to make contact with a seat surface of the rim and an outer-side contact surface to make contact with a flange of the rim, and the outer-side contact surface has inner-side, outer-side and middle portions such that when not mounted to the rim, the middle portion is recessed inward with respect to imaginary straight line L1 passing through outer edges of the inner-side and outer-side portions.

20 Claims, 4 Drawing Sheets

HEAVY DUTY PNEUMATIC TIRE

CROSS-REFERENCE TO RELATED APPLICATIONS

The present application is based upon and claims the benefit of priority to Japanese Patent Application No. 2014-032427, filed Feb. 24, 2014, the entire contents of which are incorporated herein by reference.

BACKGROUND OF THE INVENTION

Field of the Invention

The present invention relates to a heavy duty pneumatic tire.

Description of Background Art

Japanese Patent Laid-Open Publication No. H10-44724 describes a tire in which a short filler structure is included. The entire contents of this publication are incorporated herein by reference.

SUMMARY OF THE INVENTION

According to one aspect of the present invention, a heavy duty pneumatic tire includes a tread, a pair of side walls extending from edges of the tread substantially inward in a radial direction, respectively, a pair of beads positioned inward with respect to the side walls in an axial direction, respectively, a carcass extending between the beads along an inner side of the tread and inner sides of the side walls, and a pair of bead fillers laminated outward with respect to the beads in the axial direction, respectively. Each of the beads includes a core and an apex extending outward with respect to the core in a radial direction, the carcass includes a carcass ply folded back around the core from an inner side of the core toward an outer side of the core in the axial direction such that the carcass ply has a main portion positioned between the beads and a folding-back portion positioned outward with respect to the beads in the axial direction, each of the bead fillers is laminated outward with respect to the folding-back portion of the carcass ply in the axial direction and has an outer edge positioned outward with respect to a bead base line in the radial direction, an inner edge positioned inward with respect to the bead base line and outward with respect to a bead toe in the radial direction and a fitting portion formed to fit to a rim, the fitting portion includes a bottom surface formed to make contact with a seat surface of the rim and an outer-side contact surface extending from the bottom surface outward in the radial direction and formed to make contact with a flange of the rim, and the outer-side contact surface has an inner-side portion, an outer-side portion and a middle portion formed between the inner-side portion and the outer-side portion in the radial direction such that when the heavy duty pneumatic tire is not mounted to the rim, the middle portion is recessed inward with respect to an imaginary straight line L1 passing through an outer edge Pa of the inner-side portion and an outer edge Pb of the outer-side portion in the axial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
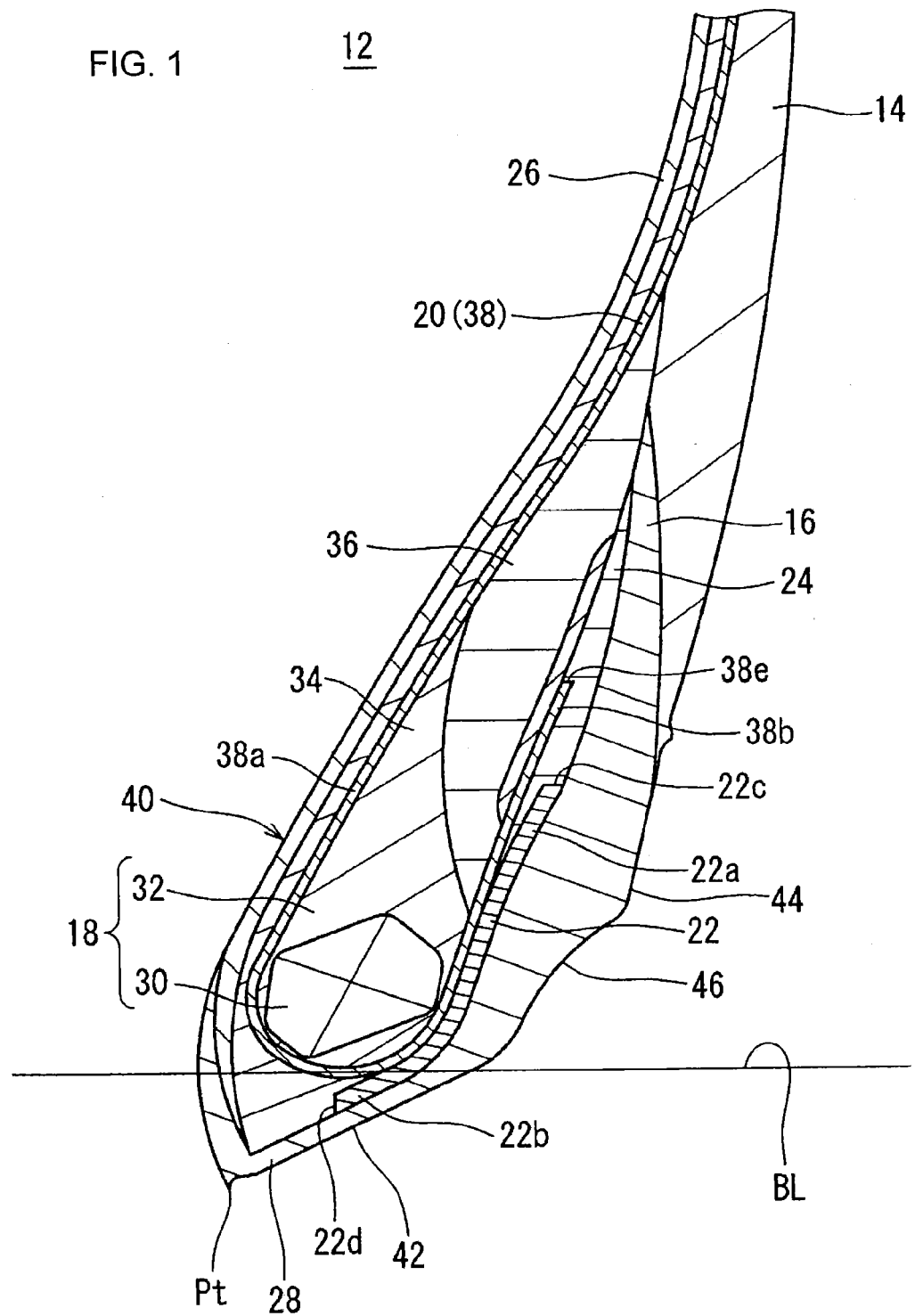
FIG. 1 illustrates a cross-sectional view in which a portion of a pneumatic tire according to an embodiment of the present invention is illustrated.

The embodiments will now be described with reference to the accompanying drawings, wherein like reference numerals designate corresponding or identical elements throughout the various drawings.

FIG. 1 illustrates a pneumatic tire 12. In FIG. 1, an up-down direction is a radial direction of the tire 12; a left-right direction is an axial direction of the tire 12; and a direction perpendicular to a paper surface is a circumferential direction of the tire 12. A straight line (BL) represents a bead base line.

The tire 12 includes a side wall 14, a clinch 16, a bead 18, a carcass 20, a bead filler 22, a cover rubber 24, an inner liner 26 and a chafer 28. The tire 12 is of a tubeless type. The tire 12 is mounted to a truck, a bus or the like. The tire 12 is a heavy duty pneumatic tire.

Although not illustrated in the drawings, the tire 12 includes a tread and a belt. The tire 12 has a shape that is left-right symmetric except for a tread pattern. The tire is formed in a shape that is symmetric about a plane (hereinafter, referred to as an equator plane) parallel to the circumferential direction at a center in the axial direction, except for the tread pattern.

Although not illustrated in the drawings, the tread has a shape that is convex outward in the radial direction. The tread is formed of a crosslinked rubber. The tread forms a tread surface that is in contact with a road surface. The tread includes a base layer and a cap layer. The cap layer is positioned on a radial-direction outer side of the base layer. The cap layer is laminated on the base layer. Usually, the base layer is formed of a crosslinked rubber that is excellent in adhesiveness. A typical base material rubber of the base layer is a natural rubber. Usually, the cap layer is formed of a crosslinked rubber that is excellent in wear resistance, heat resistance and grip performance.

Although not illustrated in the drawings, the belt is positioned on an inner side of the tread in the radial direction. The belt extends in the axial direction. The belt is positioned on a radial-direction outer side of the carcass 20. The belt reinforces the carcass 20. For example, the belt includes a first layer, a second layer, a third layer and a fourth layer. The layers are laminated from the first layer to the fourth layer in the radial direction. Each of the layers is formed of a large number of parallel-aligned cords and a topping rubber. Each of the cords is formed of steel. Each of the cords is inclined with respect to the equator plane. An absolute value of an angle formed by each of the cords with respect to the equator plane ranges from 15 to 70 degrees.

The side wall 14 extends from an edge of the tread substantially inwardly in the radial direction. A radial-direction outer-side edge of the side wall 14 is joined to the tread. A radial-direction inner-side edge of the side wall 14 is joined to the clinch 16. The side wall 14 is formed of a crosslinked rubber that is excellent in cut resistance and weather resistance. The side wall 14 prevents the carcass 20 from being damaged.

The clinch 16 is positioned substantially on a radial-direction inner side of the side wall 14. The clinch 16 is positioned on a more outer side in the axial direction than the bead 18 and the carcass 20. Although not illustrated in the drawings, when the tire 12 is mounted to a rim, the clinch 16 is in contact with a flange of the rim. The clinch 16 is formed of a crosslinked rubber that is excellent in wear resistance.

The bead 18 is positioned on a radial-direction inner side of the side wall 14. The bead 18 has a core 30 and an apex 32 that extends from the core 30 outward in the radial direction. The apex 32 includes a hard apex 34 that extends from the core 30 outward in the radial direction and a soft apex 36 that extends from the hard apex 34 outward in the radial direction. The core 30 is in a ring shape and includes a wound non-stretchable wire. A typical material of the wire is steel. The hard apex 34 is tapered outward in the radial direction. The hard apex 34 is formed of a high-hardness crosslinked rubber. The soft apex 36 is formed a crosslinked rubber that is softer as compared to the hard apex 34.

The carcass 20 includes a carcass ply 38. The carcass ply 38 extends between the beads 18 on both sides along inner sides of the treads and the side walls 14. The carcass ply 38 is folded back around the core 30 from an axial-direction inner side toward an axial-direction outer side. Due to the folding back, a main part (38*a*) and a folding-back part (38*b*) are formed in the carcass ply 38. The main part (38*a*) is positioned between the beads 18 of both sides. The folding-back part (38*b*) is positioned on an axial-direction outer side of the bead 18. An outer edge (38*e*) of the folding-back part (38*b*) is positioned on an outer side of the apex 32 in the axial direction. The outer edge (38*e*) is positioned on an outer side of the soft apex 36. Concentration of a stress on the outer edge (38*e*) is relaxed by the soft apex 36.

Although not illustrated in the drawings, the carcass ply 38 is formed of a large number of parallel-aligned cords and a topping rubber. An absolute value of an angle formed by each of the cords with respect to the equator plane ranges from 45 to 90 degrees, and further from 75 to 90 degrees. In other words, the carcass 20 has a radial structure. Each of the cords is formed of steel. The carcass 20 may also be formed from two or more layers of the carcass plies 38.

The bead filler 22 is positioned on an axial-direction outer side of the bead 18. The bead filler 22 is laminated on an axial-direction outer side of the carcass ply 38. An outer edge portion (22*a*) of the bead filler 22 in the radial direction is positioned between the folding-back part (38*b*) and the clinch 16. A radial-direction inner edge portion (22*b*) of the bead filler 22 is positioned between the carcass ply 38 and the chafer 28. The inner edge portion (22*b*) is wound around the core 30.

An outer edge (22*c*) of the bead filler 22 is positioned on an outer side than the bead base line in the radial direction. The outer edge (22*c*) is positioned on a radial-direction inner side than the outer edge (38*e*) of the folding-back part (38*b*). An inner edge (22*d*) of the bead filler 22 is positioned on a radial-direction inner side than the bead base line. The inner edge (22*d*) is positioned on a radial-direction outer side than a bead toe (Pt).

The bead filler 22 is formed of a large number of parallel-aligned cords and a topping rubber. The bead filler 22 is formed, for example, from a steel filler. Each of the cords is formed of steel. The bead filler 22 suppresses deformation of the bead 18. The bead filler 22 contributes to improvement in durability of the tire 12.

The cover rubber 24 is positioned on an outer side than the soft apex 36 in the axial direction. As illustrated in FIG. 1, the cover rubber 24 covers the outer edge (38*e*) of the folding-back part (38*b*). The cover rubber 24 can relax concentration of a stress on the outer edge (38*e*) of the folding-back part (38*b*).

The inner liner 26 forms an inner surface of the tire 12. The inner liner 26 is formed of a crosslinked rubber. A rubber excellent in air impermeability is used for the inner liner 26. A typical base material rubber of the inner liner 26 is a butyl rubber or a halogenated butyl rubber. The inner liner 26 maintains an inner pressure of the tire 12.

The chafer 28 is positioned in a vicinity of the bead 18. When the tire 12 is mounted to a rim, the chafer 28 is in contact with the rim. Due to the contact, the vicinity of the bead 18 is protected. In the present embodiment, the chafer 28 is integrated with the clinch 16. Therefore, a material of the chafer 28 is the same as a material of the clinch 16. The chafer 28 may be formed from a fabric and a rubber with which the fabric is impregnated.

In an embodiment of the present invention, the bead 18 and portions around the bead 18 together are referred to as a fitting part 40 of the tire 12. The fitting part 40 includes, in addition to the bead 18, portions of the clinch 16, the bead filler 22, the cover rubber 24, the chafer 28, the carcass 20 and the inner liner 26 around the bead.

The fitting part 40 has a bottom surface 42 facing inward in the radial direction and an outer-side surface 44 facing outward in the axial direction. The outer-side surface 44 includes an outer-side contact surface 46. The tire 12 is mounted to a normal rim, and the outer-side surface 44 opposes a flange. In a state in which the tire is filled with air of a normal internal pressure, a region of a radial-direction inner side of the outer-side surface 44 is in contact with the flange. In an embodiment of the present invention, of the outer-side surface 44, the region in contact with the flange is particularly referred to as an outer-side contact surface 46.

In the tire 12, the chafer 28 forms the bottom surface 42. The clinch 16 forms the outer-side contact surface 46. The above-described outer edge (22*c*) of the bead filler 22 is positioned on a radial-direction outer side than the outer-side contact surface 46.

Figure 2:
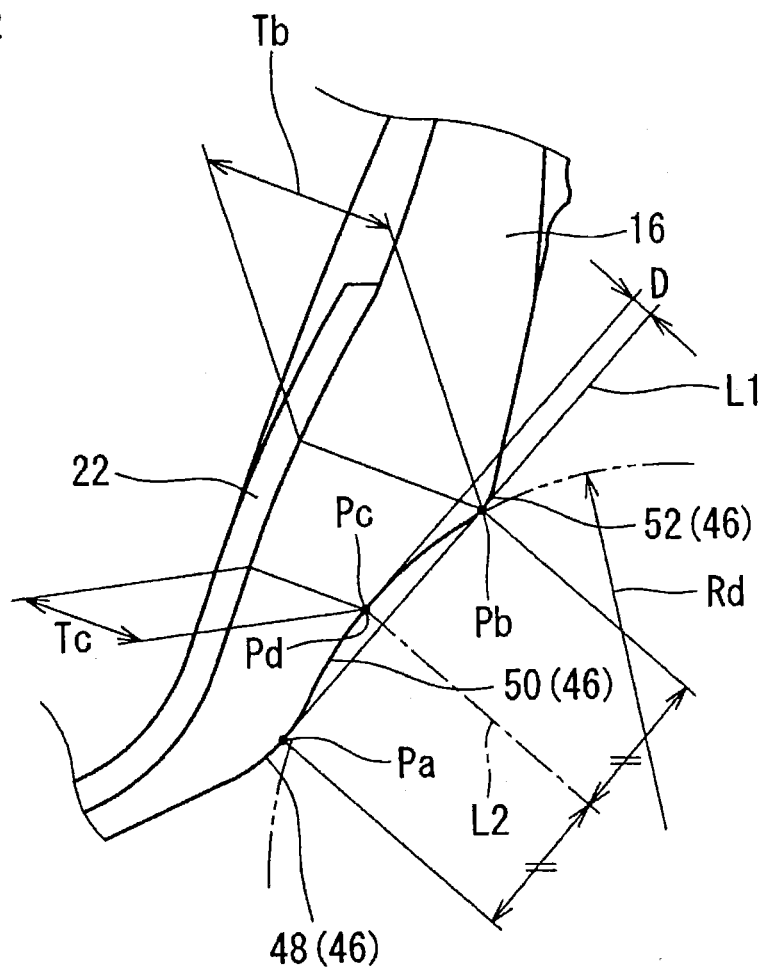
FIG. 2 illustrates an explanatory diagram in which a portion of the tire of FIG. 1 is enlarged.

FIG. 2 illustrates a partial enlarged view of the tire 12. The outer-side contact surface 46 includes an inner-side portion 48 that is a region on a radial-direction inner side, a middle portion 50 that is a region on a radial-direction outer side of the inner-side portion 48, and an outer-side portion 52 that is a region on a radial-direction outer side of the middle portion 50. The middle portion 50 is positioned between the inner-side portion 48 and the outer-side portion 52 in the radial direction. The middle portion 50 is recessed toward an inner side of the tire 12 with respect to the inner-side portion 48 and the outer-side portion 52.

A reference numeral symbol (Pa) in FIG. 2 indicates an axial-direction outer edge of the inner-side portion 48. The outer edge (Pa) indicates an outermost position in the inner-side portion 48 in the axial direction. A reference numeral symbol (Pb) indicates an axial-direction outer edge of the outer-side portion 52. The outer edge (Pb) indicates an outermost position in the outer-side portion 52 in the axial direction. A straight line (L1) indicates an imaginary straight line that passes through the outer edge (Pa) and the outer edge (Pb). A two-dot chain line (L2) indicates an imaginary straight line that passes through a midpoint between the outer edge (Pa) and the outer edge (Pb) and is orthogonal to the imaginary straight line (L1). A reference numeral symbol (Pc) indicates an intersection point of the imaginary straight line (L2) and the middle portion 50. The point (Pc) indicates a point of the middle portion 50 corresponding to the midpoint between the outer edge (Pa) and the outer edge (Pb) in an embodiment of the present invention.

A double-arrow (Tb) in FIG. 2 indicates a thickness of the clinch 16 at the outer edge (Pb) of the outer-side portion 52. The thickness (Tb) is measured in a direction perpendicular an axial-direction outer-side surface of the bead filler 22. A double-arrow (Tc) indicates a thickness of the clinch 16 at the point (Pc) of the middle portion 50. The thickness (Tc) is measured in the same direction as the direction in which the thickness (Tb) is measured.

A reference numeral symbol (Pd) in FIG. 2 indicates a position that is most away from the imaginary straight line (L1) in the middle portion 50. A distance between the imaginary straight line (L1) and the point (Pd) is measured in a direction orthogonal to the imaginary straight line (L1). A double-arrow (D) indicates the distance between the imaginary straight line (L1) and the point (Pd). In the tire 12, the point (Pd) indicates the same position as the point (Pc). However, the point (Pd) may be a position different from the point (Pc).

In the cross section illustrated in FIG. 2, the outer-side contact surface 46 is formed in an arc shape in a region from a vicinity of the outer edge (Pa) of the inner-side portion 48 to a vicinity of the outer edge (Pb) of the outer-side portion 52. An arrow (Rd) indicates a curvature radius of the arc. The outer-side contact surface 46 of the fitting part 40 is recessed in the arc shape along the circumferential direction.

Figure 3:
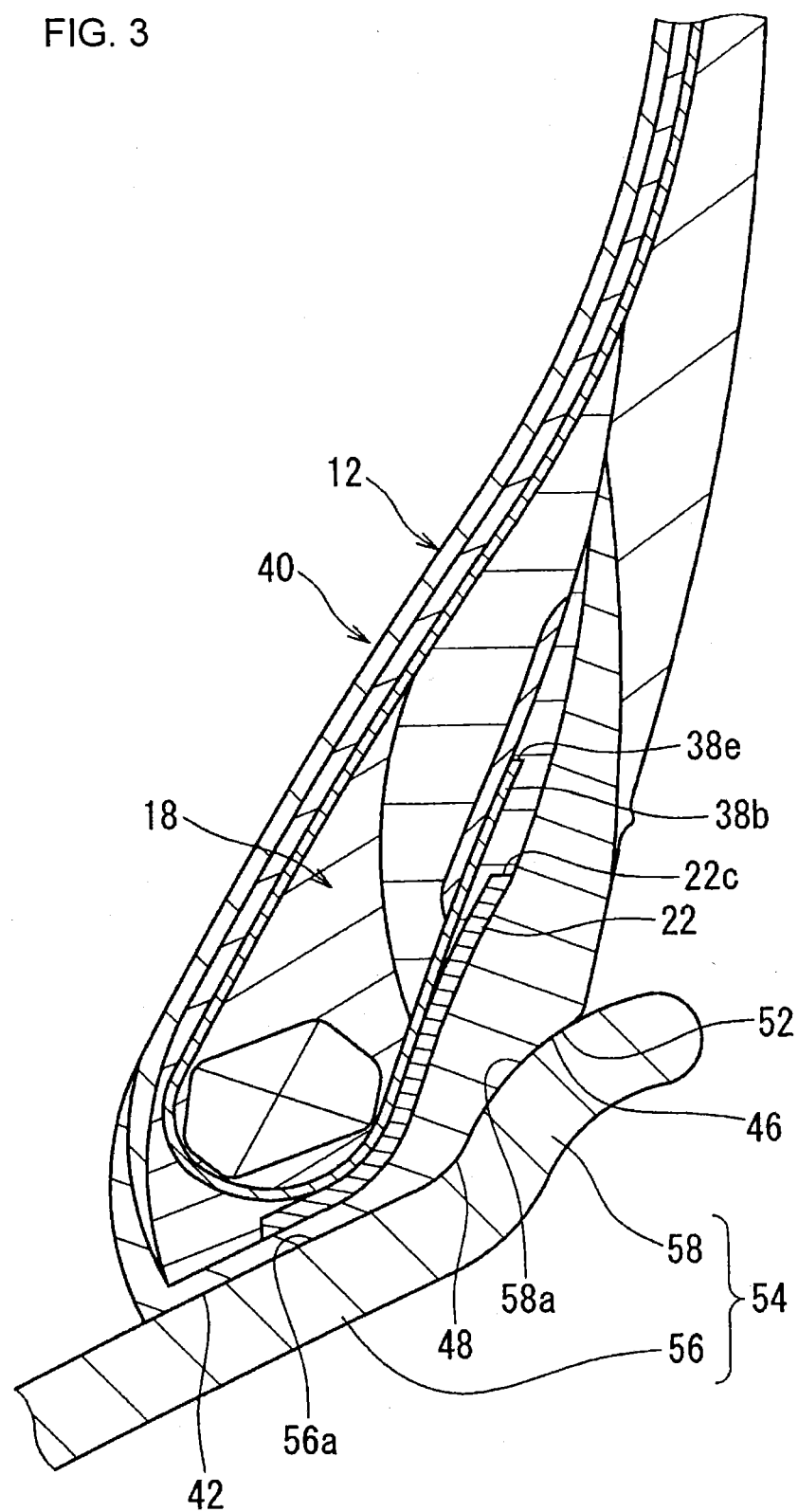
FIG. 3 illustrates an explanatory diagram that illustrates, together with a normal rim, a state in which the tire of FIG. 1 is used.

FIG. 3 illustrates a state in which the tire 12 is mounted to a rim 54 and is filled with air of a normal internal pressure. The fitting part 40 is fitted to the rim 54. The rim 54 is a normal rim.

The rim 54 includes a seat 56 and a flange 58. The seat 56 forms a seat surface (56a) with which the bottom surface 42 of the fitting part 40 of the tire 12 is in contact. The flange 58 forms a flange surface (58a) with which the outer-side contact surface 46 of the fitting part 40 is in contact.

The middle portion 50 of the outer-side contact surface 46 of the tire 12 is more recessed toward an inner side of the tire 12 than the imaginary straight line (L1) (see FIG. 2). The outer-side contact surface 46 is in contact with the flange 58 of the rim 54. As compared to the conventional tire 2, in the tire 12, contact pressures between the inner-side portion 48 and the outer-side portion 52 of the outer-side contact surface 46 and the flange surface (58a) are high. As a result, even when the tire 12 receives a load or a lateral force, it is suppressed that a position and a range where the contact pressure between the outer-side contact surface 46 and the flange surface (58a) is high are changed. The change of the position and the range is suppressed. Therefore, movement of the fitting part 40 with respect to the rim 54 is suppressed. Movement of the bead 18 with respect to the rim 54 is suppressed. Since the movement of the bead 18 is suppressed, occurrence of PTL is suppressed.

The bead filler 22 of the tire 12 is not positioned on an axial-direction inner side of the apex 32. Since the outer-side contact surface 46 suppresses the movement of the bead 18, without covering the axial-direction inner side of the apex 32 by the bead filler 22, occurrence of PTL is suppressed. In the tire 12, light weight is achieved by reducing the bead filler 22 in size and occurrence of PTL is suppressed.

In the tire 12, the radial-direction outer edge (22c) of the bead filler 22 is positioned on a radial-direction inner side than the outer edge (38e) of the folding-back part (38b) of the carcass ply 38. The bead filler 22, being positioned on an inner side than the outer edge (22c) in the radial direction, further contributes to the reduction in the weight of the tire 12. In the tire 12, since the outer-side contact surface 46 suppresses the movement of the bead 18, despite that the outer edge (38e) of the folding-back part (38b) is not covered by the bead filler 22, occurrence of PTL is suppressed. An embodiment of the present invention can particularly exert its effect for the tire 12 in which the outer edge (22c) of the bead filler 22 is positioned on a radial-direction inner side than the outer edge (38e) of the folding-back part (38b).

In the region of the outer-side contact surface 46, the thickness of the clinch 16 gradually becomes thicker from a radial-direction inner side toward a radial-direction outer side. Even in the inwardly recessed middle portion 50, the thickness of the clinch 16 gradually becomes thicker from the radial-direction inner side toward the radial-direction outer side. By having the clinch 16, a contact area between the outer-side contact surface 46 and the flange surface (58a) is increased. Further, the contact pressure between the outer-side portion 52 and the flange surface (58a) is increased. As a result, even when the tire 12 receives a load or a lateral force, movement of the fitting part 40 with respect to the rim 54 is suppressed. Movement of the bead 18 with respect to the rim 54 is suppressed.

In the tire 12 for which a ratio (Tb/Tc) between the thickness (Tb) and the thickness (Tc) of the clinch 16 is large, a volume of the clinch 16 that can be compressively deformed by the flange 58 is reduced. When the ratio (Tb/Tc) is too large, the contact pressure between the clinch 16 and the flange 58 is reduced. When the contact pressure is reduced, the movement of the clinch 16 is likely to become large. The movement of the outer edge (38e) of the folding-back part (38b) is likely to become large. Energy loss due to the deformation of the rubber of the tire 12 is likely to increase. From this viewpoint, the ratio (Tb/Tc) is preferably 3.0 or less, and more preferably 2.5 or less.

On the other hand, in the tire 12 for which the ratio (Tb/Tc) is small, the volume of the clinch 16 that can be compressively deformed by the flange 58 becomes large. When the ratio (Tb/Tc) is too small, the volume of the clinch 16 that compressively deforms becomes too large. The contact pressure between the clinch 16 and the flange 58 is increased. Due to the increased contact pressure, the movement of the clinch 16 is likely to become large. The movement of the outer edge (38e) of the folding-back part (38b) is likely to become large. Energy loss due to the deformation of the rubber of the tire 12 is likely to increase. From this viewpoint, the ratio (Tb/Tc) is preferably 1.5 or more, and more preferably 2.0 or more.

Further, in the tire 12 for which a ratio (D/Rd) between the curvature radius (Rd) of the arc shape of the middle portion 48 and the depth (D) of the arc shape is large, the volume of the clinch 16 that can be compressively deformed by the flange 58 is reduced. When the ratio (D/Rd) is too large, the contact pressure between the clinch 16 and the flange 58 is reduced. When the contact pressure is reduced, the movement of the clinch 16 is likely to become large. The movement of the outer edge (38e) of the folding-back part (38b) is likely to become large. Energy loss due to the deformation of the rubber of the tire 12 is likely to increase. From this viewpoint, the ratio (D/Rd) is preferably 0.09 or less, and more preferably 0.08 or less.

On the other hand, in the tire 12 for which the ratio (D/Rd) is small, the volume of the clinch 16 that can be compressively deformed by the flange 58 becomes large. When the ratio (D/Rd) is too small, the volume of the clinch 16 that compressively deforms becomes too large. The contact pressure between the clinch 16 and the flange 58 is increased. Due to the increased contact pressure, the movement of the clinch 16 is likely to become large. The movement of the outer edge (38e) of the folding-back part (38b) is likely to become large. Energy loss due to the deformation of the rubber of the tire 12 is likely to increase. From this viewpoint, the ratio (D/Rd) is preferably 0.05 or more, and more preferably 0.06 or more.

In an embodiment of the present invention, dimensions and angles of the respective members of the tire 12 are measured, as illustrated in FIG. 1, in a cross section that is cut out from the tire 2. The normal rim in the present specification means a rim prescribed in standards on which the tire 12 is based. A "Standard Rim" in JATMA standards, a "Design Rim" in TRA standards, and a "Measuring Rim" in ETRTO standards are normal rims. The normal internal pressure in the present specification means an internal pressure prescribed in standards on which the tire 12 is based. A "Highest Air Pressure" in the JATMA standards, a "Maximum Value" published in "Tire Load Limits at Various Cold Inflation Pressures" in the TRA standards, and an "Inflation Pressure" in the ETRTO standards are normal internal pressures.

EXAMPLES

In the following, effects of an embodiment of the present invention are made clear by examples. However, the present invention is not to be construed as being limited based on descriptions of the examples.

Example 1

A pneumatic tire was obtained that has a basic structure illustrated in FIG. 1 and specifications illustrated in the following Table 1. A size of the tire was "11R22.5."

Comparative Example 1

Figure 4:
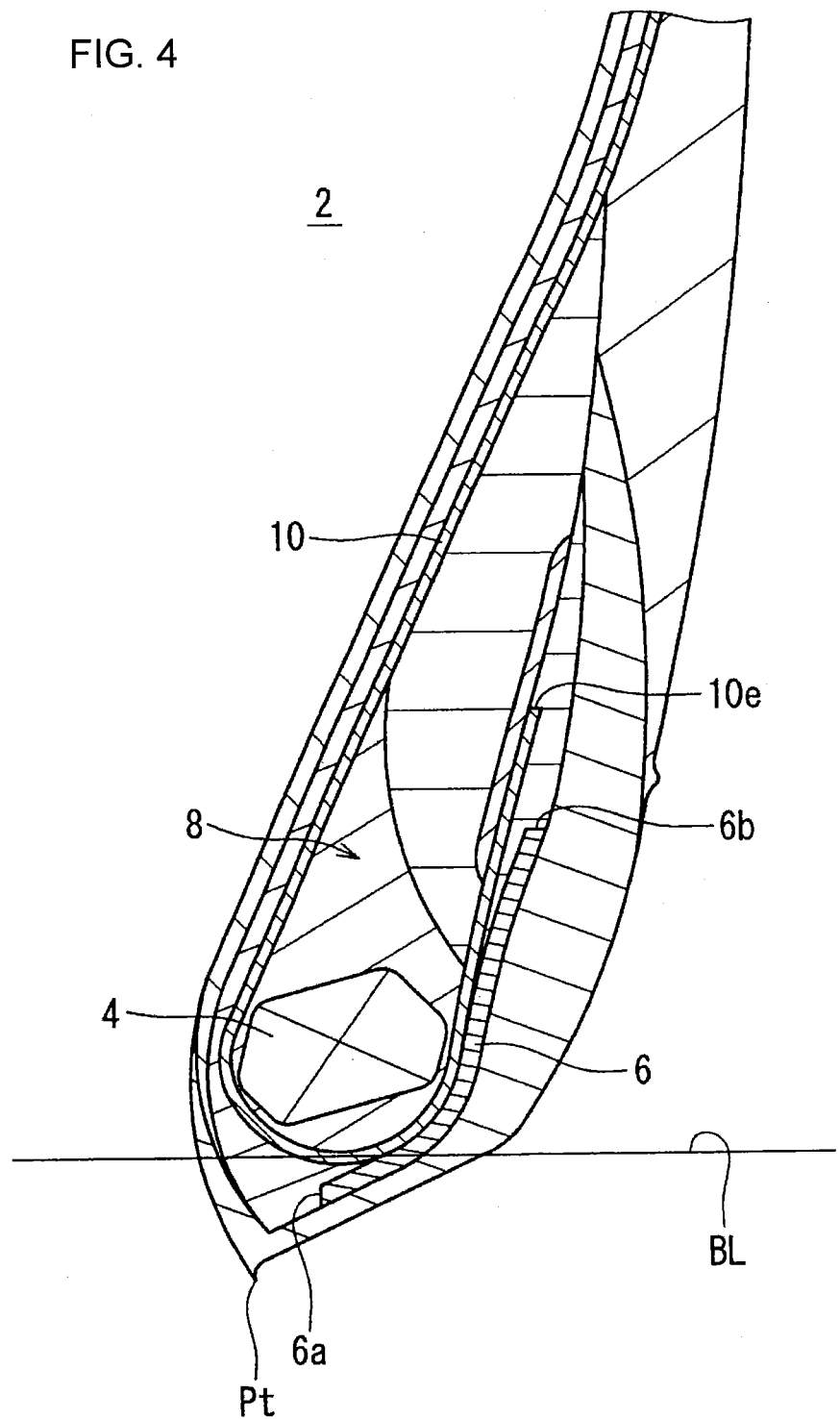
FIG. 4 illustrates a cross-sectional view in which a portion of a conventional tire is illustrated.

A commercially available tire was prepared having a basic structure illustrated in FIG. 4.

Example 2-7

Tires were obtained in the same manner as Example 1 except that values of the ratio (Tb/Tc) between the thickness (Tb) and the thickness (Tc) of the clinch were as listed in the following Table 1.

Example 8-13

Tires were obtained in the same manner as Example 1 except that values of the ratio (D/Rd) between the curvature radius (Rd) of the arc shape of the middle portion 48 and the depth (D) of the arc shape were as listed in the following Table 2.

PTL Resistance

Each of the tires was mounted to a normal rim of "22.5×8.5." The tire was filled with air so that the tire had an internal pressure of 1000 kPa. The tire was mounted to a drum-type running tester, and a vertical load of 76.53 kN was loaded onto the tire. The tire was caused to travel at 20 km/h on a drum and the durability of the bead was evaluated. The results are presented in the following Tables 1 and 2 as index values with a value of the tire of Example 1 being 100. A larger index value indicates a more preferable durability.

Fuel Economy Performance

Rolling resistance was measured using a rolling resistance tester under the following measurement conditions.

Rim Used: 22.5×8.5
Internal Pressure: 800 kPa
Load: 26.72 kN
Speed: 80 km/h

The results are presented in the following Tables 1 and 2 as index values with a value of the tire of Example 1 being 100. A larger index value indicates a more preferable fuel economy performance.

TABLE 1

| | Evaluation Results | | | | | | | |
|---|---|---|---|---|---|---|---|---|
| | Comparative Example 1 | Example 6 | Example 4 | Example 2 | Example 1 | Example 3 | Example 5 | Example 7 |
| Structure | FIG. 4 | FIG. 1 | FIG. 1 | FIG. 1 | FIG. 1 | FIG. 1 | FIG. 1 | FIG. 1 |
| Ratio Tb/Tc | — | 1.2 | 1.5 | 2.0 | 2.3 | 2.5 | 3.0 | 3.3 |
| Ratio D/Rd | — | 0.07 | 0.07 | 0.07 | 0.07 | 0.07 | 0.07 | 0.07 |
| PTL Resistance | 88 | 93 | 98 | 100 | 100 | 100 | 98 | 93 |
| Fuel Economy Performance | 90 | 95 | 98 | 100 | 100 | 100 | 98 | 95 |

TABLE 2

| | Evaluation Results | | | | | |
|---|---|---|---|---|---|---|
| | Example 12 | Example 10 | Example 8 | Example 9 | Example 11 | Example 13 |
| Structure | FIG. 1 | FIG. 1 | FIG. 1 | FIG. 1 | FIG. 1 | FIG. 1 |
| Ratio Tb/Tc | 2.3 | 2.3 | 2.3 | 2.3 | 2.3 | 2.3 |
| Ratio D/Rd | 0.04 | 0.05 | 0.06 | 0.08 | 0.09 | 0.1 |
| PTL Resistance | 93 | 98 | 100 | 100 | 98 | 93 |
| Fuel Economy Performance | 95 | 98 | 100 | 100 | 98 | 95 |

As illustrated in Table 1 and 2, in the tires of the examples, the PTL resistance is improved while a rolling resistance similar to that of the tire of the comparative example is maintained. From the results of the evaluation, advantages attributable to an embodiment of the present invention are clear.

The tire described above can be broadly applied to heavy duty tires.

A heavy duty pneumatic tire is mounted to a truck, a bus or the like. The heavy duty pneumatic tire is used under severe conditions such as high internal pressure and high load. In the tire, a large load is likely to act on a bead. The bead is likely to be poor in durability. Further, from a viewpoint of achieving low fuel consumption, lightweight is also desired for the heavy duty pneumatic tire.

FIG. 4 illustrates a portion of a conventional heavy duty pneumatic tire 2. The tire 2 includes a bead filler 6. The bead filler 6 is positioned in a vicinity of a bead core 4. The bead filler 6 is laminated on an axial-direction outer side of the bead 8. A turn-in edge (6a) of the bead filler 6 is positioned on a radial-direction outer side than a bead toe (Pt) and on a radial-direction inner side than a bead base line (BL). A turn-up edge (6b) of the bead filler 6 is positioned on a radial-direction outer side than the bead base line (BL).

A structure in which the bead filler 6 is provided is referred to as a so-called short filler structure. The tire 2 includes the short filler structure. By including the short filler structure, the bead 8 is reinforced. Further, a range in which the bead filler 6 is laminated is minimized. Therefore, an increase in weight is suppressed. In the tire 2, the increase in weight is suppressed, and durability of the bead 8 is improved.

In the tire 2, the bead filler 6 does not cover an axial-direction inner side of the bead 8. When an external force is applied to a carcass ply 10 on the axial-direction inner side, the carcass ply 10 is likely to move while largely deforming. Along with the deformation and movement of the carcass ply 10, the bead 8 deforms and moves. The deformation and movement of the bead 8 leads to peeling off of a turn-up edge (10e) of the carcass ply 10. The peeling off of the turn-up edge (10e) is referred to as ply turn-up loose (hereinafter, referred to as PTL).

Further, the deformation and movement of the carcass ply 10 and the bead 8 increase energy loss. Energy loss of the tire 2 is likely to increase. The increase in energy loss causes fuel economy performance to decrease.

A heavy duty pneumatic tire according to an embodiment of the present invention improves PTL resistance and fuel economy performance while achieving light weight.

A heavy duty pneumatic tire according to an embodiment of the present invention includes: a tread; a pair of side walls that respectively extends from edges of the tread substantially inward in a radial direction; a pair of beads that are respectively positioned on an axial-direction inner side than the side walls; a carcass that extends between one bead and the other bead along inner sides of the tread and the side walls; and a bead filler that is laminated on an axial-direction outer side of each of the beads.

The beads each include a core and an apex that extends on a radial-direction outer side of the core. The carcass includes a carcass ply. The carcass ply is folded back around the core from an axial-direction inner side toward an axial-direction outer side. Due to the folding back, a main part that is positioned between one bead and the other bead, and a folding-back part that is positioned on an axial-direction outer side of the beads, are formed in the carcass ply. The bead filler is laminated on an axial-direction outer side of the folding-back part of the carcass ply. A radial-direction outer edge of the bead filler is positioned on a radial-direction outer side than a bead base line. A radial-direction inner edge of the bead filler is positioned on a radial-direction inner side than the bead base line and is positioned on a radial-direction outer side than a bead toe.

The tire has a fitting part that fits to a normal rim. The fitting part has a bottom surface that is in contact with a seat surface of the rim, and an outer-side contact surface that extends from the bottom surface outward in the radial direction and is in contact with a flange of the rim. The outer-side contact surface includes, in the radial direction, an inner-side portion, an outer-side portion, and a middle portion that is positioned between the inner-side portion and the outer-side portion. In a state in which the tire is not mounted to the rim, the middle portion is formed to be more recessed inward than an imaginary straight line (L1) that passes through an axial-direction outer edge (Pa) of the inner-side portion and an axial-direction outer edge (Pb) of the outer-side portion.

Preferably, the radial-direction outer edge of the bead filler is positioned on a radial-direction inner side than a radial-direction outer edge of the folding-back part of the carcass ply.

Preferably, the fitting part includes a clinch that is positioned on an axial-direction outer side of the bead filler. The clinch forms an outer-side contact surface that is in contact with the flange of the normal rim. In a region of the outer-side contact surface, a thickness of the clinch gradually becomes thicker from a radial-direction inner side toward a radial-direction outer side.

Preferably, the fitting part includes a clinch that is positioned on an axial-direction outer side of the bead filler. The clinch forms an outer-side contact surface that is in contact with the flange of the normal rim. A ratio (Tb/Tc) between a thickness (Tb) of the clinch at the axial-direction outer edge (Pb) of the outer-side portion and a thickness (Tc) of the clinch at a point (Pc) of the middle portion, the point (Pc) corresponding to a midpoint between the axial-direction outer edge (Pa) of the inner-side portion and the axial-direction outer edge (Pb) of the outer-side portion, is 1.5 or more and 3.0 or less.

Preferably, the middle portion is recessed in an arc shape at a depth (D) in a cross section perpendicular to a circumferential direction. A ratio (D/Rd) between a curvature radius (Rd) of the arc shape and the depth (D) is 0.05 or more and 0.09 or less.

In a pneumatic tire according to an embodiment of the present invention, since the short filler structure is provided, light weight is achieved and durability of the bead is improved. Further, the middle portion of the outer-side surface of the fitting part is formed to be recessed with respect to the inner-side portion and the outer-side portion, and thus is in close contact with the flange of the normal rim. As a result, when the tire is filled with air or when a load is loaded, movement of the carcass or the apex is suppressed. As a result, despite that the short filler structure is provided, PTL resistance and fuel economy performance are improved.

Obviously, numerous modifications and variations of the present invention are possible in light of the above teachings. It is therefore to be understood that within the scope of the appended claims, the invention may be practiced otherwise than as specifically described herein.

What is claimed is:

1. A heavy duty pneumatic tire, comprising:
a tread;
a pair of side walls extending from edges of the tread substantially inward in a radial direction, respectively;
a pair of beads positioned inward with respect to the side walls in an axial direction, respectively;
a carcass extending between the beads along an inner side of the tread and inner sides of the side walls;
a pair of bead fillers laminated outward with respect to the beads in the axial direction, respectively; and
a pair of fitting portions configured to fit to a rim such that each of the fitting portions comprises a chafer configured to make contact with the rim and a clinch positioned outward with respect to a respective one of the bead fillers in the axial direction,
wherein each of the beads includes a core and an apex extending outward with respect to the core in a radial direction, the carcass includes a carcass ply folded back around the core from an inner side of the core toward an outer side of the core in the axial direction such that the carcass ply has a main portion positioned between the beads and a folding-back portion positioned outward with respect to the beads in the axial direction, each of the bead fillers is laminated outward with respect to the folding-back portion of the carcass ply in the axial direction and has an outer edge positioned outward with respect to a bead base line in the radial direction and an inner edge positioned inward with respect to the bead base line and outward with respect to a bead toe in the radial direction, each of the fitting portions includes a bottom surface configured to make contact with a seat surface of the rim and an outer-side contact surface extending from the bottom surface outward in the radial direction and configured to make contact with a flange of the rim, the outer-side contact surface has an inner-side portion, an outer-side portion and a middle portion formed between the inner-side portion and the outer-side portion in the radial direction such that when the heavy duty pneumatic tire is not mounted to the rim, the middle portion is recessed inward with respect to an imaginary straight line L1 passing through an outer edge Pa of the inner-side portion and an outer edge Pb of the outer-side portion in the axial direction, each of the fitting portions satisfies a ratio Tb/Tc in a range of 1.5 to 3.0 where Tb represents a thickness of the clinch at the outer edge Pb of the outer-side portion, Tc represents a thickness of the clinch at a point Pc of the middle portion corresponding to a midpoint between the outer edge Pa of the inner-side portion and the outer edge Pb of the outer-side portion, and each of the fitting portions has the middle portion recessed in an arc shape at a depth D in a cross section perpendicular to a circumferential direction such that a ratio D/Rd is in a range of from 0.05 to 0.09 where Rd represents a curvature radius of the arc shape.

2. The heavy duty pneumatic tire according to claim 1, wherein the outer edge of each of the bead fillers is positioned inward with respect to the outer edge of the folding-back portion of the carcass ply in the radial direction.

3. The heavy duty pneumatic tire according to claim 1, wherein the clinch forms the outer-side contact surface configured to make contact with the flange of the rim, and the clinch has a thickness which gradually becomes greater from an inside to an outside in the radial direction in a region of the outer-side contact surface.

4. The heavy duty pneumatic tire according to claim 1, wherein the clinch forms the outer-side contact surface configured to make contact with the flange of the rim, and the ratio Tb/Tc is in a range of 1.5 to 2.5.

5. The heavy duty pneumatic tire according to claim 1 wherein the ratio D/Rd is in a range of from 0.05 to 0.08.

6. The heavy duty pneumatic tire according to claim 2, wherein the clinch forms the outer-side contact surface configured to make contact with the flange of the rim, and the clinch has a thickness which gradually becomes greater from an inside to an outside in the radial direction in a region of the outer-side contact surface.

7. The heavy duty pneumatic tire according to claim 2, wherein the clinch forms the outer-side contact surface configured to make contact with the flange of the rim, and the ratio Tb/Tc is in a range of 1.5 to 2.5.

8. The heavy duty pneumatic tire according to claim 2, wherein the ratio D/Rd is in a range of from 0.05 to 0.08.

9. The heavy duty pneumatic tire according to claim 1, wherein the clinch forms the outer-side contact surface configured to make contact with the flange of the rim, and the ratio Tb/Tc is in a range of 2.0 to 3.0.

10. The heavy duty pneumatic tire according to claim 1, wherein the ratio D/Rd is in a range of from 0.06 to 0.09.

11. The heavy duty pneumatic tire according to claim 2, wherein the ratio D/Rd is in a range of from 0.06 to 0.09.

12. The heavy duty pneumatic tire according to claim 1, wherein the clinch forms the outer-side contact surface configured to make contact with the flange of the rim, and the ratio Tb/Tc is in a range of 2.0 to 2.5.

13. The heavy duty pneumatic tire according to claim 2, wherein the clinch forms the outer-side contact surface configured to make contact with the flange of the rim, and the ratio Tb/Tc is in a range of 2.0 to 2.5.

14. The heavy duty pneumatic tire according to claim 3, wherein the clinch forms the outer-side contact surface configured to make contact with the flange of the rim, and the ratio Tb/Tc is in a range of 2.0 to 2.5.

15. The heavy duty pneumatic tire according to claim 5, wherein the clinch forms the outer-side contact surface configured to make contact with the flange of the rim, and the ratio Tb/Tc is in a range of 2.0 to 2.5.

16. The heavy duty pneumatic tire according to claim 1, wherein the ratio D/Rd is in a range of from 0.06 to 0.08.

17. The heavy duty pneumatic tire according to claim 2, wherein the ratio D/Rd is in a range of from 0.06 to 0.08.

18. The heavy duty pneumatic tire according to claim 3, wherein the ratio D/Rd is in a range of from 0.06 to 0.08.

19. The heavy duty pneumatic tire according to claim 4, wherein the ratio D/Rd is in a range of from 0.06 to 0.08.

20. The heavy duty pneumatic tire according to claim 1, wherein each of the fitting portions comprises the chafer integrated with the clinch and comprising a same material as the clinch, and each of the bead fillers comprises a plurality of parallel-aligned cords and a topping rubber.

* * * * *